Patented Aug. 25, 1936

2,052,268

UNITED STATES PATENT OFFICE 2,052,268

PRODUCTION OF VALUABLE PRODUCTS FROM UNSATURATED COMPOUNDS AND HYDROGEN SULPHIDE

Evan Clifford Williams and Clyve Charles Allen, Berkeley, Calif., assignors to Shell Development Company, San Francisco, Calif., a corporation of Delaware No Drawing. Application March 18, 1935, Serial No. 11,678

20 Claims. (Cl. 260—151)

This invention relates to a process for reacting an unsaturated organic compound with hydrogen sulphide at an elevated temperature and a superatmospheric pressure to obtain a valuable addition product of the class consisting of mercaptans, thioethers and saturated hydrocarbons.

This invention provides a practical and economical method for the utilization of hydrogen sulphide to effect the conversion of olefinic compounds, particularly those contained in or derived from petroleum and/or petroleum products, such as the olefines, polyolefines and olefine polymers to valuable addition products thereof. The conditions under which our invention is executed will be dependent upon the nature of the addition compound desired as the main reaction product. We may react a suitable unsaturated compound with hydrogen sulphide under such conditions that the olefinic bond is saturated by hydrogen sulphide resulting in a product predominating in the corresponding mercaptan, or we may effect the reaction under such conditions and with the reactants present in such relative amounts that the main reaction product is the corresponding thioether. Under still different conditions of reaction, the hydrogen sulphide can be made to react with the olefinic compound in such a manner that hydrogen from the hydrogen sulphide is added to the double bond or bonds and the main reaction product is the corresponding saturated hydrocarbon.

The nature of the addition product predominantly obtained is dependent upon the operating temperature, the phase in which the reaction occurs, the contact time of the reactants and upon the molal ratio of the reactants present in the reaction system. By a suitable control of these reaction factors, the invention may be executed to obtain the desired addition product, readily and economically, in excellent yields.

To obtain substantially only a mercaptan or a thioether or a mixture of mercaptans and thioethers, our invention is preferably executed in the vapor phase under a superatmospheric pressure at temperatures in the range of from about 35° C. to about 300° C., however, higher temperatures may in some cases be resorted to if other factors controlling the course of the reaction are suitably adjusted. On the other hand, if a saturated hydrocarbon is desired as the main reaction product, we preferably treat the higher boiling unsaturated compounds, that is, those containing at least six carbon atoms to the molecule and effect reaction, if possible, in the liquid phase under superatmospheric pressures and temperatures materially above about 100° C. The execution of the invention to obtain a substantial yield of a saturated hydrocarbon usually requires a relatively longer contact time of the reactants than would be required for the substantial formation of mercaptans and/or thioethers under substantially the same conditions.

We are aware that prior investigators have proposed processes for effecting the addition of hydrogen sulphide to the double bond of the lower mono-olefines to obtain mercaptans. The process of our invention clearly distinguishes from these known processes as will be apparent as the description of the invention proceeds.

Numerous advantages are inherent in our method for the production of mercaptans. Our process does not require the use of powerful condensation, polymerization and absorption agents which induce undesirable side reactions and prevent the attainment of practical yields of mercaptan. The higher yields obtained in accordance with our invention are also dependent on the fact that the addition reaction proceeds more nearly under equilibrium conditions and the simple addition reaction is not the only reaction relied upon to yield mercaptan. These advantages reside in the over-all equilibrium of the reactants and products in the system represented by the equations:

(1) $\quad C_nH_{2n} + H_2S \rightleftarrows C_nH_{2n+1}SH$ (2) $\quad C_nH_{2n} + C_nH_{2n+1}SH \rightleftarrows (C_nH_{2n+1})_2S$ (3) $\quad 2C_nH_{2n} + H_2S \rightarrow (C_nH_{2n+1})_2S$ (4) $\quad (C_nH_{2n+1})_2S + H_2S \rightleftarrows 2C_nH_{2n+1}SH$ In accordance with the above mechanism, mercaptan formation may occur in two manners. First, by the direct addition of hydrogen sulphide to the olefinic linkage in accordance with Reaction (1) and, secondly, by the reaction of hydrogen sulphide with the thioether formed in accordance with Equations (2) and (3). The reactions represented by Equations (2) to (4) are novel and inherent only in the reaction of an olefinic compound with hydrogen sulphide in accordance with our invention.

By a suitable control of the molal ratio of the reactants present in the system and the reaction conditions, we may cause a mercaptan or a thioether to predominate in the reaction mixture. The higher temperatures and higher pressures favor the reaction to form products predominating in thioethers and, in addition under substantially the same conditions of temperature and pressure, the attainment of high yields of thioethers requires relatively longer contact times of the reactants. The desired sulphur product may also be made to predominate by a control of the molal ratio of the reactants present in the reaction system. When a mercaptan is desired as the main reaction product, the olefine is reacted with an equivalent quantity or an excess of hydrogen sulphide, while thioether formation is favored by the use of at least two mols of mono-olefine to each mol. of hydrogen sulphide present. Another suitable means of causing a mercaptan to predominate materially in the reaction product comprises effecting the reaction of an olefine with hydrogen sulphide in the presence of an excess of the thioether which would ordinarily be formed by reaction of the mercaptan with the olefine. The presence of an excess of the thioether represses the further formation of thioethers and results in higher conversions of the applied olefines to mercaptans. The reaction to form mercaptans and/or thioethers may be advantageously effected in either the presence or absence of catalysts; however, it is in general desirable to effect reaction in the presence of an active metal sulphide, particularly when a product predominating in a mercaptan is desired.

Recapitulating, by a suitable control of temperature, pressure, reaction time and initial molal ratio of olefinic compound to hydrogen sulphide and, in some cases, by the selection of a preferential catalyst, and by effecting reaction in the presence of an excess of one of the reaction products, either a mercaptan or a thioether may be obtained as the predominant reaction product.

The saturated hydrocarbons which may be obtained are probably formed by a mechanism which may be represented by the equations:

(1) $C_nH_{2n} + H_2S \rightarrow C_nH_{2n+2} + S$
(2) $C_nH_{2n} + H_2S \rightarrow C_nH_{2n+1}SH$
(3) 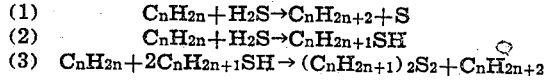

The saturated hydrocarbon may be obtained by the simultaneous occurrence of Reactions (1) and (3). These reactions are favored by reaction temperatures materially above 100° C. and by the use of relatively much longer contact times than when substantially only mercaptans and/or thioethers are desired. The above reactions are best effected in the liquid phase and with the higher boiling unsaturated hydrocarbons. We prefer to employ equimolecular proportions of the reactants or a slight excess of hydrogen sulphide.

The unsaturated compounds to which our invention is particularly applicable possess at least one olefinic linkage between two aliphatic carbon atoms regardless of the character of the compound embracing such a linkage. The unsaturated hydrocarbons such as the olefines, which term is intended to also include the olefine polymers and polyolefines, are particularly contemplated; however, it is to be understood that such compound wherein one or more hydrogen atoms have been substituted by suitable organic and/or inorganic substituents may be advantageously employed.

The invention is generally executed with compounds such as ethylene, propylene, the butylenes, the amylenes, the hexylenes, the heptylenes, the octylenes, etc., and their higher homologues as well as their analogues such as the phenyl and naphthyl ethylenes, propylenes, butylenes, etc., and the polyolefines such as divinyl, diallyl, isoprene, diisopropenyl, diisobutenyl and the like. A particularly suitable group of olefinic hydrocarbons which may be converted to the corresponding valuable saturated hydrocarbons are the olefine polymers, particularly those containing at least six carbon atoms and a branched chain such as diisobutylene, triisobutylene, tetraisobutylene, the polyisoamylenes, the polyisohexylenes, the polyisoheptylenes, etc. Such olefine polymers may be converted to the corresponding mercaptans, thioethers or the corresponding saturated branched chain hydrocarbons which are particularly useful as fuels and components of fuel mixtures.

We may employ the unsaturated compounds severally or treat mixtures comprising more than one species in which case mixed products will be obtained. In some cases, reaction may be advantageously effected in the presence of relatively unreactive substances such as paraffins, halogenated hydrocarbons, oils, inert gases and the like, which substances may act as diluents and/or as solvents or they may by virtue of their vapor pressure enable us to employ greater operating pressures when desired. We may treat technical olefine-containing mixtures without separating the olefine or olefines therefrom. Such mixtures may be obtained by the pyrogenesis of petroleum, petroleum products, shale oil, etc., and by the destructive distillation of coal, peat, pitches, tars, asphalts and the like carbonaceous materials. If desired such an olefine-containing mixture may be fractionated into cuts containing, for the most part, compounds possessing the same number of carbon atoms. A typical fraction of this sort is the butane-butene cut which usually contains normal and iso-butanes and butylenes and sometimes small amounts of diisobutylene. If desired, the olefines or a particular olefine may be separated from such a cut or the original mixture by fractionation, extraction, condensation or the like means. The use of a pure or substantially pure olefinic material may facilitate reaction control and recovery of pure products.

The hydrogen sulphide employed may be in a substantially pure condition or in admixture with olefines or with relatively unreactive fluid substances. For example, refinery, smelting and other industrial H₂S-containing gases may be employed without purification or such mixtures may be treated and the hydrogen sulphide recovered therefrom in the desired degree of purity.

The invention is preferably executed under substantially anhydrous conditions. Prior to effecting reaction, the reagents or mixtures containing them may be rendered substantially anhydrous by a suitable drying operation. To insure anhydrous conditions, we preferably effect reaction in the presence of a sufficient quantity of a suitable water-binding agent to combine with and remove from the sphere of reaction free water initially present or formed in the course of the reaction. A suitable water-binding agent will be capable of existing as a fluid or dissolved in the reaction mixture under operating conditions and be capable of combining with and retaining water without detrimentally effecting the reaction. A group of preferably employed water-binding agents includes the anhydrides of carboxylic acids, such as the anhydrides of the acids as acetic, propionic, butyric, isobutyric, valeric, isovaleric, caproic, crotonic, malonic, succinic, benzoic, cinnamic and the like as well as their homologues, analogues and suitable substitution products.

The invention may be executed in the present or absence of materials capable of catalyzing the reaction. In the majority of cases when the object is to produce primarily mercaptans and/or thioethers, the reaction is accelerated by the presence of metals and metal compounds, particularly the metal sulphides, which act as catalysts. A group of suitable catalysts which may be employed severally or in combination includes the sulphides of calcium, beryllium, zinc, magnesium, strontium, barium, aluminum, chromium, zirconium, tin, copper, thallium, vanadium, molybdenum, tungsten, arsenic, antimony, platinum, nickel, iron and cobalt. The sulphides of nickel, iron and cobalt are particularly active and preferably employed catalysts which may be conveniently and economically prepared from readily available and inexpensive materials.

The particular catalyst or catalyst composition to be employed may be prepared in an active state in a variety of manners. The metals and/or their compounds such as the oxides, hydroxides, etc. may be treated with hydrogen sulphide and converted to the sulphide before or during the course of the reaction, or other sulphidizing agents may be reacted with metals or metal compounds under conditions favorable to metal sulphide formation. Active metal sulphides may also be prepared by the thermal decomposition of the corresponding thio-salts.

The catalytic material may be applied as a finely divided powder, as granules, as pellets or in any other convenient form. If desired, the catalytic material may be precipitated upon an inert carrier such as pumice, silica gel, kieselguhr, charcoal, etc.

When metal reaction vessels are used, the catalytic metal sulphide may be deposited in the form of a film on the interior surface thereof. Such a catalyst coating may be conveniently formed by contacting the clean metal surface with hydrogen sulphide or a solution of a soluble hydrosulphide or sulphide under conditions at which the desired metal sulphide is formed.

The invention is in general executed in closed reaction vessels with the reaction mixture under the total vapor pressure of its constituents at the reaction temperature. The pressure employed is greater than atmospheric and dependent upon the temperature and whether a gas or liquid phase reaction is desired. If desired, the pressure on the reaction mixture may be increased by the introduction of an inert volatile liquid or gas. The addition reactions which occur in accordance with my invention are favored by the higher pressure, however, excessively high pressures, for example those greater than about 3500 lbs./sq. in., may favor undesirable side reactions and render the process less economical in that costly high pressure equipment would be necessitated.

We preferably execute our invention at temperatures sufficiently elevated to permit reaction at a practical rate but sufficiently low to substantially avoid the occurrence of undesirable condensation and/or pyrolytic side reactions. The temperature most advantageously employed is dependent upon the type of product desired, the reaction time, the thermal stability of the reactants and products and upon whether liquid or gas phase reaction is desired. In general, temperatures in the range of from about 35° C. to about 500° C. are suitable. The thioethers and/or mercaptans are best prepared in the range of from 35° C. to about 300° C., while the saturated hydrocarbons are preferably formed at temperatures of from about 100° C. to about 500° C.

When a metal sulphide catalyst is employed, the stability of said catalyst or catalyst mixture also determines, to a certain extent, the optimum reaction temperature. For example, ferric sulphide suffers partial decomposition and loss of catalytic activity at temperatures of about 190° C., while nickel sulphide is substantially stable and active at temperatures of 300° C. and higher.

Our invention may be executed in a batch, intermittent or continuous manner. The reactants and/or a third agent may be charged, severally or in admixture, to a suitable reaction vessel such as an autoclave or tubular reactor equipped with heating and cooling means. A suitable water-binding agent and/or catalyst may be added before, during or after introduction of the reactants to the reactor. The reaction mixture is heated to the desired temperature and under the desired elevated pressure for a time sufficient to effect the desired degree of reaction. Agitation as by mechanical stirring may be advantageous, especially when reaction is effected in the liquid phase in the presence of a solid catalyst. The reaction product or products may be recovered from the reaction mixture by any suitable means such as fractionation, condensation, stratification, extraction and the like. The unreacted reagents may be recovered and reutilized in the same or another reaction unit.

Another mode of executing the invention, which is particularly suitable for intermittent and continuous modes of operation, comprises passing the gaseous and/or liquid reactants, at the desired rate, severally or in combination, continuously or intermittently, into a reaction chamber maintained at a suitable temperature and which may or may not contain catalytic material. The reaction occurs therein at the desired rate under a superatmospheric pressure. The reacted mixture may be continuously or intermittently withdrawn from the reaction vessel and, if desired, conducted to a separation and/or purification stage wherein the product or products is or are separated from each other and the unreacted reagent and the latter, if any is present, conducted to the same or another reaction unit for reutilization therein.

Other suitable modes of operation and modification of those described will be apparent to those skilled in the art to which the invention appertains.

The following specific examples typify preferred modes of executing our invention. It is to be understood that these examples are for illustrative purposes and that the invention is not intended to be limited thereby.

*Example I*

A mixture of about 107 gm. (1.91 mols) of isobutene and about 195 gm. (5.7 mols) of hydrogen sulphide was charged to a steel autoclave containing active nickel sulphide deposited on pumice. The contents of the autoclave were heated under the combined vapor pressure of the constituents of the reaction mixture at a temperature of about 250° C. for about one hour. At the end of this time the reaction mixture was cooled and discharged from the reaction vessel. After the excess of $H_2S$ was removed the liquid residue was fractionated.

The reaction product was a mixture of butyl mercaptans of which 118 gm. (1.31 mols) were obtained. This represents a conversion of about 68.5% of the applied isobutene to butyl mercaptan. No appreciable quantity of butyl thioether was formed.

Example II

A mixture of isobutene and hydrogen sulphide in the molal ratio of 1:1 was sealed in a glass reaction vessel and the mixture heated at about 170° C. for about six hours. At the end of this time, the reaction vessel was cooled and its contents discharged and analyzed.

It was found that about 8.8% of the isobutene and 5.7% of the H₂S had reacted. The reaction product contained butyl mercaptan and di-tertiary butyl sulphide in the molal ratio of about 1 mol. of mercaptan to 0.94 mol. of thioether.

Example III

The interior surface of a steel autoclave was coated with a film of active iron sulphide. A mixture of about 56.1 gm. (1.0 mol.) of isobutene and 34.1 gm. (1.0 mol.) of H₂S was charged to the autoclave and heated therein at about 170° C. for about six hours under the combined vapor pressure of the reactants and products. At the end of this time, the cooled reaction mixture had the composition:

|  | Grams |
|---|---|
| Unreacted isobutene | 23.8 |
| Unreacted hydrogen sulphide | 18.4 |
| Tertiary butyl mercaptan | 32.0 |
| Di-tertiary butyl sulphide | 14.9 |
| Olefine polymer | 0.84 |

Calculated on this basis, 64.4% of the isobutene and 51.2% of the hydrogen sulphide reacted to yield 0.356 mol. of tertiary butyl mercaptan and 0.102 mol. of di-tertiary butyl sulphide. The product contained mercaptan and thioether in the molal ratio of 3.59 to 1.

This example illustrates the desirability of executing the reaction in the presence of a metal sulphide catalyst. In this example, with the exception of the catalyst employed, the conditions are identical with those of Example I.

Example IV

An autoclave was charged with about 56.1 gm. (1.0 mol.) of isobutene and about 44.7 gm. (1.31 mols) of H₂S and the contents heated at about 140° C. at a gauge pressure of approximately 3000 lbs./sq. in. for 2.5 hours.

The cooled reaction mixture was analyzed. It contained tertiary butyl mercaptan and di-tertiary butyl sulphide in the ratio of 1.6 mols of the thioether to 1 mol. of mercaptan.

This example illustrates a mode of executing the invention to obtain a product predominating in a thioether.

Eample V

About 400 gm. of a butane-butene mixture consisting of about 31% β-butene, 4% α-butene, 60% butane and about 5% of other hydrocarbons was charged to an autoclave lined with active nickel sulphide and about 130 gm. of H₂S was added thereto. This mixture was heated at about 190° C. under a gauge pressure of from about 2575 to 2800 lbs./sq. in. for about six hours.

Butyl mercaptans and thioethers were obtained in the approximate ratio of 1.3 mols of butyl mercaptan to 1 mol. of di-butyl sulphide.

Example VI

The interior surface of a steel autoclave was coated with a film of active iron sulphide. This autoclave was charged with a mixture comprising about 50 gm. (0.71 mol.) of amylene prepared by effecting the dehydration of tertiary amyl alcohol, 36 gm. (1.06 mols) of H₂S and about 2.0 gms. of acetic anhydride. This mixture was heated at about 115° C. under the combined vapor pressure of its constituents for about 15 hours.

The reaction mixture was then cooled and fractionated. Amyl mercaptans and diamyl sulphides were obtained in the ratio of 2.17 mols of mercaptan to 1 mol. of thioether.

Example VII

About 112.13 gm. (1.0 mol.) of diisobutylene was charged to a glass lined autoclave and about 54.0 gm. (1.58 mols) of H₂S were added thereto. This mixture was heated to a temperature of about 250° C. for about 20 hours.

The reaction mixture was cooled, discharged from the reaction vessel and fractionated. The main reaction product was iso-octane which was obtained in a yield of 74% calculated on the diisobutylene applied.

The example is illustrative of my invention as applied to the production of valuable saturated hydrocarbons.

Example VIII

About 112.13 gm. (1.0 mol.) of diisobutylene was contacted with about 92 gm. (2.7 mol.) of hydrogen sulphide in the presence of about 3 gm. of propionic anhydride in a steel autoclave. This mixture was heated at a temperature of about 250° C. for about 17 hours. The addition reaction occurred in the liquid phase under a pressure equal to the combined vapor pressures of the constituents of the reaction mixture.

The main reaction product was iso-octane which was obtained in a yield of about 73.1% calculated on the diisobutylene applied.

Example IX

The interior surface of a nickel plated autoclave was coated with a film of active nickel sulphide. About 40 gm. (0.715 mol.) of isobutene, 42 gm. (1.23 mols) of H₂S, 2 gm. of acetic anhydride and about 30 gm. (0.21 mol.) of di-tertiary butyl sulphide were charged to the autoclave and heated therein, under a superatmospheric pressure equal to the combined vapor pressure of the constituents of the reaction mixture, at a temperature of about 190° C. for about 17 hours.

At the end of this time the cooled reaction mixture was discharged from the autoclave, neutralized and distilled. When the unreacted isobutene and H₂S had been removed, the residue was found to consist of 51 gm. (0.567 mol.) of tertiary butyl mercaptan and 38 gm. (0.26 mol.) of di-tertiary butyl sulphide. The reaction to form the thioether was by the presence of the initially introduced di-tertiary butyl sulphide suppressed to such an extent that 84% of the reacted isobutene formed mercaptan while only 16% reacted to form the thioether. The reaction product contained the tertiary butyl mercaptan and di-tertiary butyl sulphide in the ratio of 13.1 mols of mercaptan to 1 mol. of thioether.

This example illustrates a mode of executing the invention in the presence of a relatively large amount of a thioether to repress thioether formation and obtain high conversion of the olefine to mercaptan.

The products obtained by our process may be used severally or in combination for a wide variety of purposes. The mercaptans per se or mixtures containing them in substantially amounts are useful as pickling inhibitors, that is, they act as inhibitors of the solvent action of acids on metals. In this connection, the mercaptans are useful as constituents of oil well cleaning compositions. The mercaptans are valuable intermediates in the preparation of a wide variety of useful organic sulphur-containing compounds. On reaction with aldehydes and ketones they are converted to mercaptals and mercaptols, respectively. They may be esterified to form thioesters and oxidized to polysulphides. Compositions useful in ore-flotation operations may in many cases be prepared by heating them with phosphorous di- and penta-chloride. The mercaptans are valuable intermediates in the preparation of dyes of the anthraquinone series, the thioindigos and the indamines. Chlorinated hydrocarbons may be stabilized by the presence of mercaptans; the butyl mercaptans being particularly suitable stabilizers for carbon tetrachloride and ethylene chloride. The mercaptans and thioethers as well as mixtures contaning them are efficacious as fly-repellents and insecticides.

The organic monosulphides or thioethers are valuable solvents for various organic materials. The compounds per se or mixtures containing them in relatively large amounts dissolve rubber, petroleum resins, the meta- and para-sulphur chloride resins and resins such as abietic acid and paracumaron. Cellulose esters are soluble in mixtures of the thioethers with the lower aliphatic alcohols. The thioethers are valuable as intermediates in the preparation of pyroxylin and pharmaceutical chemicals such as the soporific sulphones.

The higher saturated hydrocarbons, particularly those of branched chain structure which possess at least six carbon atoms to the molecule, are useful as fuels and components of fuel mixtures and lubricating oils. In addition, such hydrocarbons are useful as solvents and as raw material for resin production, etc.

While we have described our invention in a detailed manner and provided specific examples of suitable modes of executing the same, it is to be understood that modifications may be made and that no limitations, other than those imposed by the scope of the appended claims are intended.

We claim as our invention:

1. A process for the production of a valuable addition product of the class consisting of mercaptans, thioethers and saturated hydrocarbons which comprises reacting a hydrocarbon containing an olefinic linkage between two aliphatic carbon atoms with hydrogen sulphide at a superatmospheric pressure and a temperature greater than about 35° C. but below the temperature at which substantial pyrolysis occurs in the presence of a water-binding agent which is substantially incapable of inducing polymerization and condensation reactions and which combines with and retains free water present in the reaction mixture under reaction conditions.

2. A process for the production of a valuable addition product of the class consisting of mercaptans, thioethers and saturated hydrocarbons which comprises reacting a hydrocarbon containing an olefinic linkage between two aliphatic carbon atoms with hydrogen sulphide at a superatmospheric pressure and a temperature of from about 35° C. to about 500° C. in the presence of a water-binding agent which is substantially incapable of inducing polymerization and condensation reactions and which combines with and retains free water present in the reaction mixture under reaction conditions.

3. A process for the production of a valuable addition product of the class consisting of mercaptans, thioethers and saturated hydrocarbons which comprises reacting a hydrocarbon containing an olefinic linkage between two aliphatic carbon atoms with hydrogen sulphide under substantially anhydrous conditions at a superatmospheric pressure and a temperature of from about 35° C. to about 500° C. in the presence of a water-binding agent which is substantially incapable of inducing polymerization and condensation reactions and which combines with and retains free water present in the reaction mixture under reaction conditions.

4. A process for the production of a valuable addition product of the class consisting of mercaptans, thioethers and saturated hydrocarbons which comprises reacting an olefine with hydrogen sulphide in the presence of a metal sulphide catalyst at a superatmospheric pressure at least equal to the combined vapor pressures of the constituents of the reaction mixture at the operating temperature and a temperature of from about 35° C. to about 500° C.

5. A process for the production of a valuable addition product of the class consisting of mercaptans, thioethers and saturated hydrocarbons which comprises reacting an olefine with hydrogen sulphide in the presence of a sufficient amount of a carboxylic acid anhydride to maintain the reaction mixture substantially anhydrous at a superatmospheric pressure and a temperature of from about 35° C. to about 500° C.

6. A process for the production of a valuable addition product of the class consisting of mercaptans, thioethers and saturated hydrocarbons which comprises reacting an olefine with hydrogen sulphide in the presence of a carboxylic acid anhydride and a sulphide of a metal selected from the group consisting of nickel, iron and cobalt at a superatmospheric pressure and a temperature of from about 35° C. to about 500° C.

7. A process for the production of a mercaptan which comprises reacting an olefine with hydrogen sulphide in the presence of a carboxylic acid anhydride at a superatmospheric pressure and a temperature of from about 35° C. to about 500° C.

8. A process for the production of a mercaptan which comprises reacting an olefine with hydrogen sulphide at a superatmospheric pressure and a temperature of from about 35° C. to about 300° C. in the presence of a water-binding agent which is substantially incapable of inducing polymerization and condensation reactions and which combines with and retains free water present in the reaction mixture under reaction conditions.

9. A process for the production of a mercaptan which comprises reacting an olefine with hydrogen sulphide in the initial presence of a substantial quantity of the corresponding thioether, said reaction being effected at a superatmospheric pressure and a temperature of from about 35° C. to about 300° C.

10. A process for the production of a thioether which comprises reacting an olefine with hydrogen sulphide at a superatmospheric pressure at least equal to the combined vapor pressures of the constituents of the reaction mixture at the operating temperature and a temperature of from about 35° C. to about 500° C.

11. A process for the production of a product materially predominating in a thioether which comprises reacting a mono-olefine with hydrogen sulphide in the molal ratio of at least two mols of mono-olefine to one mol. of hydrogen sulphide at a superatmospheric pressure and a temperature of from about 35° C. to 300° C.

12. A process for the production of a thioether which comprises reacting an olefine with substantially less than an equivalent amount of hydrogen sulphide in the presence of a metal sulphide catalyst at a superatmospheric pressure at least equal to the combined vapor pressures of the constituents of the reaction mixture at the operating temperature and a temperature of from about 35° C. to about 300° C.

13. A process for the production of a thioether which comprises reacting an olefine with hydrogen sulphide in the presence of a carboxylic acid anhydride at a superatmospheric pressure and a temperature of from about 35° C. to about 300° C.

14. A process for the production of a thioether which comprises reacting at least two mols of an olefine with one mol. of hydrogen sulphide in the presence of a carboxylic acid anhydride and a sulphide of a metal selected from the group consisting of nickel, iron and cobalt at a superatmospheric pressure and a temperature of from about 35° C. to about 300° C.

15. A process for the production of a saturated hydrocarbon which comprises reacting an olefine with hydrogen sulphide at a superatmospheric pressure at least equal to the combined vapor pressures of the constituents of the reaction mixture at the operating temperature and a temperature of from about 100° C. to about 500° C.

16. A process for the production of a saturated hydrocarbon which comprises reacting an olefine with hydrogen sulphide in the presence of a carboxylic acid anhydride at a superatmospheric pressure and a temperature of from about 100° C. to about 500° C.

17. A process for the production of a saturated hydrocarbon which comprises effecting the liquid phase reaction of an olefine with hydrogen sulphide in the presence of a carboxylic acid anhydride at a superatmospheric pressure and a temperature of from about 100° C. to about 500° C.

18. A process for the production of a saturated hydrocarbon which comprises reacting an olefine containing at least six carbon atoms to the molecule with hydrogen sulphide in the presence of a carboxylic acid anhydride at a superatmospheric pressure and a temperature of from about 100° C. to about 500° C.

19. A process for the production of a valuable branched chain saturated hydrocarbon which comprises reacting an olefine containing a tertiary carbon atom and at least six carbon atoms to the molecule with hydrogen sulphide at a superatmospheric pressure and a temperature of from about 100° C. to about 500° C.

20. A process for the production of iso-octane which comprises reacting diisobutylene with hydrogen sulphide at a superatmospheric pressure and a temperature of from about 250° C. to about 300° C.

EVAN CLIFFORD WILLIAMS.
CLYVE CHARLES ALLEN.